March 13, 1928.                    E. MAYER                    1,662,156
                              EXPOSURE METER
                           Filed April 25, 1927
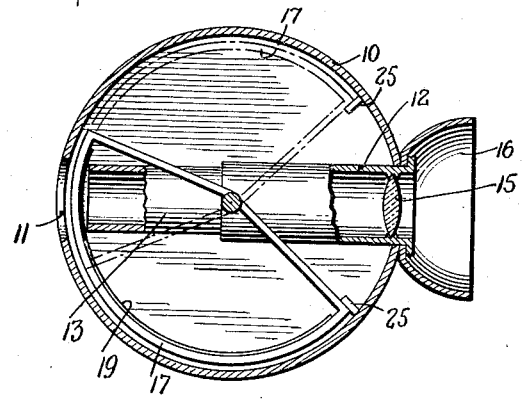
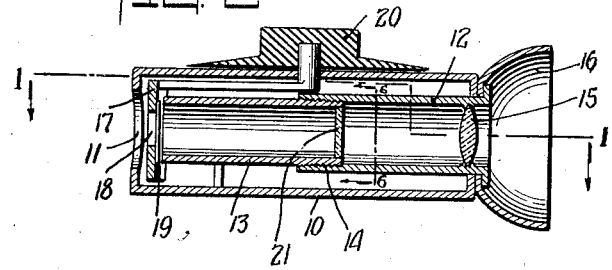
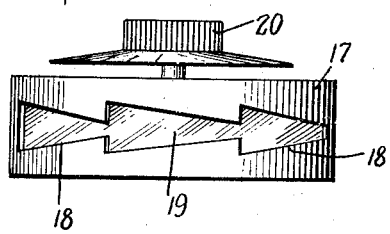
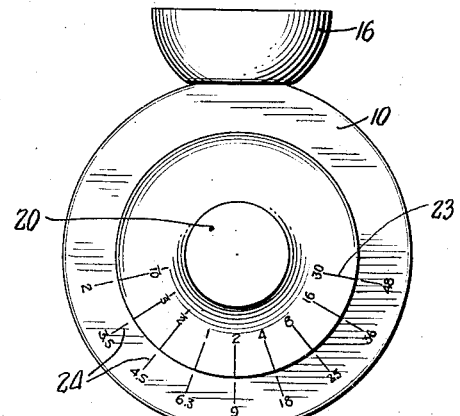
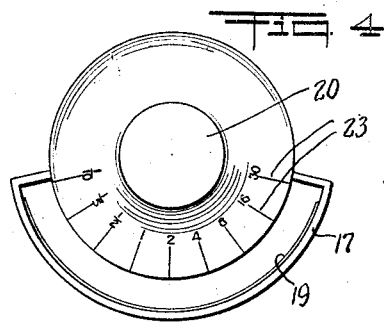
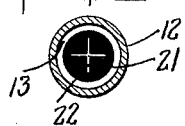
Emil Mayer
INVENTOR
BY Mock + Blum
ATTORNEYS Patented Mar. 13, 1928.

1,662,156

UNITED STATES PATENT OFFICE.

EMIL MAYER, OF VIENNA, AUSTRIA, ASSIGNOR TO DREM PRODUCTS CORPORATION, OF NEW YORK, N. Y., A CORPORATION OF NEW YORK.

EXPOSURE METER.

Application filed April 25, 1927. Serial No. 186,333.

My invention relates to a new and improved exposure meter.

One of the objects of my invention is to provide an exposure meter or light gauge which will enable a user to instantly determine the proper exposure time as well as the corresponding diaphragm setting for photographic apparatus of all kinds, including apparatus utilizing lenses, calibrated pin holes or the like so that the negatives or positives which are formed by means of the photographic apparatus will receive the correct light exposure.

Another object of my invention is to provide an exposure meter which can be directly operated to accomplish the above mentioned purposes, and in which the amount of brightness of the light is controlled. This light may be transmitted from, reflected by, radiated by or emanated in any manner from the object which is to be photographed or reproduced.

Other objects of my invention will be set forth in the following description and drawings which illustrate a preferred embodiment thereof, it being understood that the above general statements of the objects of my invention is intended merely to generally explain the same and not to limit it in any manner.

Fig. 1 is a sectional view on the line 1—1 of Fig. 2.

Fig. 2 is a vertical section of the device.

Fig. 3 is an elevation showing the slit-carrier having the slits therein and combined with the operating knob and the scale connected thereto.

Fig. 4 is a top view of the device shown in Fig. 3.

Fig. 5 is a top view of the assembled device.

Fig. 6 is a section on the line 6—6 of Fig. 2.

The device embodies a cylindrical casing 10 to the bottom of which a tube 13 is connected in any suitable manner. The inner end of this tube 13 carries a translucent member or field 21 which may have an identifying symbol 22 of some kind, such as a numeral, letter or any other suitable mark. The opposite or front end of the tube 13 is open.

A second and rear tube 12 is connected to the adjacent end of the tube 13 by means of suitable co-operating inner and outer threadings.

One end of the tube 12 is external to the casing 10 and this outer end has a magnifying lens 15 and a cup-shaped eye piece 16. Since the tube 12 is revolubly connected to the tube 13 by means of the co-operating threading previously mentioned, the tube 12 can be turned so as to have sufficient longitudinal movement to sharply focus the lens 15 in order to observe the field 21.

The light which enters the casing 10 through the front opening 11 is regulated by means of the slit-carrier 17 shown in greater detail in Fig. 3. This slit-carrier 17 has a cylindrical contour and is fastened to the operating knob 20 by means of arms or brackets. The operating knob 20 has a dial connected to its shaft, and said dial has a scale, this scale being located above the top of the casing 10. As shown in Fig. 3 the slit-carrier 17 is provided with a series of wedge-shaped slits 18. These slits 18 have backings 19 of varying light permeability. Hence, and as shown in Fig. 1, when the knob 20 is turned the slit carrier is also turned, the two extreme positions being shown in full lines and in dotted lines in Fig. 1. Stops 25 are provided on the inner wall of the casing 10 to limit the movement of the slit-carrier 17, as shown in Fig. 1.

By means of this turning movement of the slit-carrier 17 the slits therein are passed successively in front of the opening 11. Any suitable number of slits can be formed in the slit carrier 17 and they may be wedge shaped or triangular in form and they preferably have congruent identical shapes and they are backed, covered or otherwise suitably provided with material of suitably varied and graded translucency. That is, the respective slits have different degrees of translucency.

The operation of my device is as follows:

The slit-carrier 17 is first turned by the knob 20 to one extreme position, in which position the slit which has the least translucent (least light permeable) backing has its narrow pointed end or apex behind the opening 11. In this position an extremely small quantity of light enters the tube 13 and the field 21 will be perceptibly translucent so as to be visible to the eye of the user, only if the instrument receives light of maximum brightness.

By turning the knob 20 together with the slit-carrier 17, increasingly broader sections of the first slit are brought before the opening 11 so that a larger quantity of light is gradually admitted.

After the first slit has passed beyond the opening 11, the apex of the second slit which is more light permeable appears behind the light opening 11 and increasingly broader sections of the second slit are caused to pass in front of the opening 11 by continued turning of the knob 20.

The second slit is then followed by the third slit which has a very light permeable backing, or no backing at all and increasingly broader sections of the third slit are passed behind the light opening 11.

If the shape of the slits which affects the amount of the light admitted, and the translucency of the various backings 19, which control the brightness of the light admitted into the tube 13 are properly reckoned and selected, then light can be admitted in a constant and regular progression by turning the knob 20 and the slit-carrier 17.

The disc connected to the knob 20 bears a scale 23 on part of its circumference and this scale represents exposure-times in seconds. If the device is being used in connection with cinematographic cameras, the scale can represent the number of frames per second. The adjacent part of the cover of the case also has a scale 24 representing the conventional designation of the stops or diaphragm openings or vice versa. An index mark designated by an arrow-head or the like may also be provided. This index may correspond to marking 4.5 on scale 24.

The position of this index opposite the time marked on the dial scale furnishes the information necessary for correct exposure, when the field 21 or the translucent mark thereon becomes just discernible in the instant when it becomes contrasted with the darkness within the tube 13. The position of the index which is moved along the scale 24 is then noted.

The juxtaposition of the markings on scales 23 and 24 will then enable the user to immediately determine all other available diaphragm markings and their corresponding exposure-times, thus permitting instant choice of either the stop or the shutter speed for the specific light conditions involved.

A third and independently revoluble ring could be provided to indicate the time corresponding to negative material of speed, other than the normal.

A diffusing disc of frosted glass or corresponding light permeable material may be provided in front of the opening 11, or even within the tube 13 to prevent the formation of an image by the so-called pin-hole effect, when the narrowest sections of the respective slits pass before the opening.

I have shown a preferred embodiment of my invention, but it is clear that numerous changes and omissions could be made without departing from its spirit.

I claim:—

1. An exposure meter comprising a casing having an opening adapted to admit light, a tube having an open end adjacent the said opening, the said tube having associated therewith a field, and a movable slitted member located intermediate the said opening and the open end of the said tube, the said movable slitted member having a plurality of slits of varying light permeability, the respective slits being of varying width, the broad ends and the narrow ends of successive slits being adjacent each other.

2. A device according to claim 1 in which a wall of the said casing has a scale indicated thereon, the said movable slit member having an external movable member connected thereto, the said external movable member having a scale thereon adapted to co-operate with the first mentioned scale to indicate diaphragm openings and the exposure-times associated with the respective diaphragm openings.

In testimony whereof I affix my signature.

Dr. EMIL MAYER.